May 23, 1944.  W. F. HEMPERLY  2,349,413
ELECTRICAL CONDUCTOR CARRYING VINYL RESIN COMPOSITION
Filed May 16, 1940
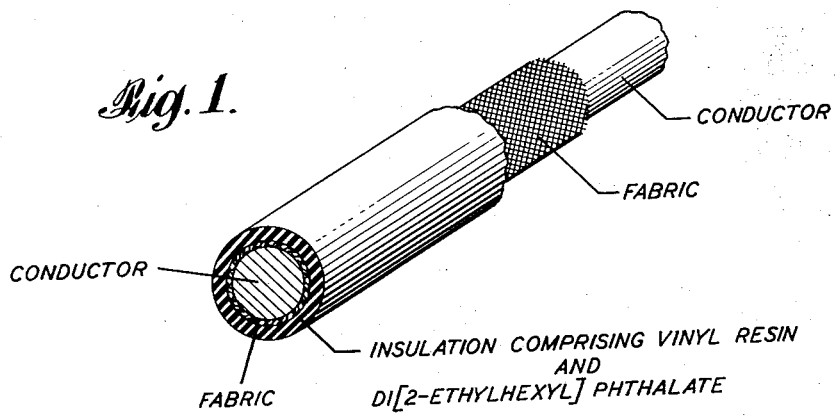
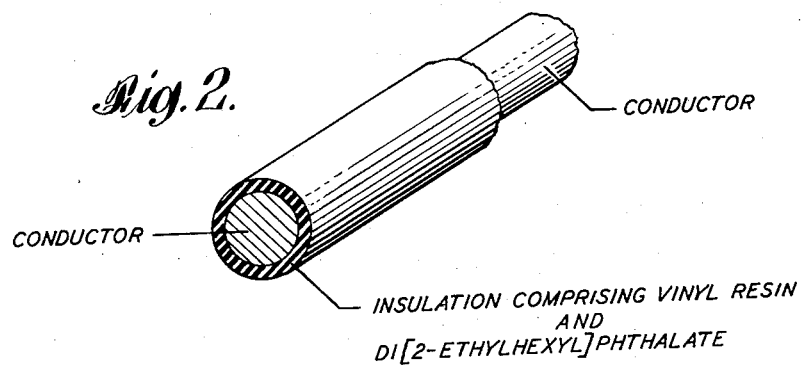
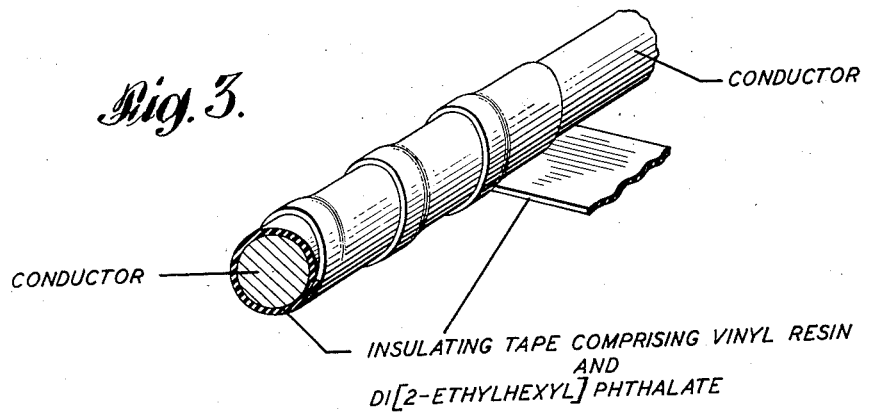
INVENTOR
WILLIAM F. HEMPERLY
BY
ATTORNEY Patented May 23, 1944

2,349,413

UNITED STATES PATENT OFFICE 2,349,413

ELECTRICAL CONDUCTOR CARRYING VINYL RESIN COMPOSITION

William F. Hemperly, Bloomfield, N. J., assignor to Union Carbide and Carbon Corporation, a corporation of New York Application May 16, 1940, Serial No. 335,504

14 Claims. (Cl. 174—125)

This invention relates to electrical insulation and particularly to the flexible type thereof which may be applied to wires, cables, etc.

Workers in the electrical art are continually seeking improvements in insulation to be applied to electrical conductors. The best insulation is that which not only has good electrical characteristics under the conditions of general use but one which is unaffected or affected to the least possible degree by abnormal conditions; for instance the insulation on a cable should not only insulate under the normal conditions but should not break down when the cable is subjected to abnormal conditions of moisture, corrosion, bending, etc. The electrical art is highly desirous of obtaining insulation which has as good electrical characteristics as it is possible to obtain and which will maintain those characteristics under adverse conditions.

In recent years vinyl chloride resins have found favor as dielectrics and insulating materials. In general, these materials are unsuitable for flexible insulation unless they are modified by the inclusion of so-called plasticizers. Certain of the resins which are derived from polymers of vinyl compounds have, in themselves, good electrical characteristics which are substantially unaffected by moisture, oil, acids, and alkali but when the usual plasticizers are employed, that is plasticizers which have heretofore been used in connection with these particular vinyl compounds, the desirable characteristics of the resins are lost to an appreciable extent.

The object of the present invention is generally to improve electrical insulation and dielectrics made of materials containing a synthetic vinyl chloride resin and provide a conductor, condenser, or other electrical apparatus having the said vinyl resin as insulation or dielectric, or both. Other and further objects of the invention will in part be obvious and will in part be pointed out in the following description and accompanying claims which, however, must not be taken as limiting the invention to the particular modifications described.

The annexed drawing illustrates conductors carrying various insulations comprising the composition contemplated herein. Fig. 1 illustrates an electrical conductor insulated with a fabric bearing the insulating composition. Fig. 2 illustrates an electrical conductor insulated with an extruded composition. Fig. 3 illustrates an electrical conductor insulated with a tape made of the composition.

The base of the insulation is a polymerized vinyl compound, for instance polymerized vinyl chloride or the conjoint polymer of vinyl chloride and vinyl acetate which, in itself, has very high insulating and dielectric values and retains these characteristics in the presence of moisture or corrosive materials. It should be understood that there are many so-called insulating materials which are not suitable for the insulation herein described as they either do not have sufficiently high insulating and dielectric characteristics or they are affected too easily by moisture, acids, or alkalies and will not stand up under unusual circumstances or are not flexible even though they may, in general, be considered as fairly good insulators, for instance materials based on cellulose are relatively good insulators when dry but quickly absorb sufficient moisture materially to decrease the insulation resistance. The same is true of resins having glycerol as a base. The unmodified phenol resins are good insulators in their final hardened condition but in that condition are not flexible and are incompatible with plasticizers, and when reacted only to a condition where they are somewhat flexible, they are subject to attack by acids and more particularly by alkalies. Furthermore, neither the cellulose based, nor the glycerol based, nor the said phenol materials have the rubbery characteristics of the vinyl resins. Thus, this invention has particularly to do with those polymerized vinyl resins which are flexible, and whose electrical characteristics do not change materially when subjected to moisture, acids and alkalies.

I have discovered that certain octyl phthalates have unusual characteristics when used in admixture with vinyl resins as plasticizers. Of the octyl phthalates I employ di(2-ethylhexyl) phthalate. Such dioctyl phthalate differs from the usual plasticizers, for instance tricresyl phosphate, in that while it plasticizes these resins, it does not, for compositions of substantially equal flexibility, impair the desirable characteristics of the polymerized vinyl resins so much as do other plasticizers, for instance tricresyl phosphate.

Conductors having insulation which is flexible are highly desirable where the conductors must be bent or where they are subject to continual vibration, for instance in house wiring where the conductors must be pulled around angles in conduits and also on ships and elevators where the conductors are subjected to continual vibrations. It has been found that if di(2-ethylhexyl) phthalate is used as a plasticizer for vinyl resins in sufficient amount to give substantially the same plasticity at room temperature as the same resin plasticized with tricresyl phosphate, the resin plasticized with di(2-ethylhexyl) phthalate maintains its flexibility better at low temperatures, for instance 0° F., while at temperatures higher than room temperature the resin plasticized with di(2-ethylhexyl) phthalate does not become so soft and has more resistance to deformation, in other words when di(2-ethylhexyl) phthalate is used as a plasticizer for the said vinyl resins, there is less change of physical characteristics per degree change of temperature than if tricresyl phosphate were used in sufficient amount to impart substantially the same flexibility at normal room temperatures.

It has been found that the same is true of certain electrical characteristics; for instance the change in resistivity per degree change in temperature is less for a resin of the above type when plasticized with di(2-ethylhexyl) phthalate than when plasticized with tricresyl phosphate. Moreover, for the frequencies most generally used in alternating current work, that is frequencies of 60 cycles and in fact for frequencies up to and higher than 1,000 cycles, the dielectric power factor and the dielectric loss factor are less for the said resins plasticized with di(2-ethylhexyl) phthalate than for resins plasticized with tricresyl phthalate. This relationship is maintained as the temperature changes.

As examples of compositions suitable for insulation in accordance with this invention, reference may be had to the following:

*Example 1.*—70 parts by weight of a conjointly polymerized vinyl resin having the approximate composition of 95% combined vinyl chloride and 5% combined vinyl acetate and having an average molecular weight in excess of 18,000 as determined by the Staudinger method, 4.5 parts of lead carbonate, 2 parts of carbon black, 1 part of mineral oil, 7.5 parts of tricresyl phosphate and 15 parts of di(2-ethylhexyl) phthalate may be mixed by kneading until homogeneous and then fed into an extrusion machine from which the mixture may be extruded as a covering around an electrical conductor. In order to insure uniformity of the material fed to the extrusion apparatus and uniformity of coating on the conductor, I have found it to be highly desirable to mix the materials under heat to a rubbery mass which may be formed into strips or rods or into pellets which are then fed into the extrusion apparatus. The lead carbonate is a stabilizer for the copolymer and may be replaced by other stabilizers, for instance litharge. The carbon black is a filler and coloring material; it may be replaced by another coloring material for instance chrome green or chrome yellow or a dye, for instance Sudan red, in sufficient amount to color the material as desired. Any amount of filler from about 5 to 25 parts of, for instant barytes, whiting, clay, fuller's earth, talc, mica or asbestos may be used. The mineral oil is a light mineral oil substantially like an S. A. E. 20 oil. Lighter or heavier oils or other lubricants for instance stearates, soaps, fatty acids, mineral or vegetable waxes etc. may be used. The 7.5 parts of tricresyl phosphate are used to replace about 4 to 5 parts of di(2-ethylhexyl) phthalate to make the composition fire resistant in the present instance and for this purpose up to 25 parts of tricresyl phosphate may be used; however, except for fire resistance, di(2-ethylhexyl) phthalate is preferred as a plasticizer for the reasons previously stated, and if the added fire resistance of the tricresyl phosphate is not required, it may be eliminated and replaced by approximately one-half to two-thirds as much dioctyl phthalate. Other fire resisting agents, preferably with plasticizing properties, for instance other aryl phosphates such as the phenyl phosphates may be used instead of tricresyl phosphate. The mineral oils and color may also be eliminated if desired.

*Example 2.*—62 parts by weight of a conjointly polymerized vinyl resin having the approximate composition of 90% combined vinyl chloride and 10% combined vinyl acetate and having an average molecular weight in excess of about 15,000, 5 parts of litharge, 2 parts of carbon black, 0.5 part of mineral oil, 10 parts of tricresyl phosphate, and 20 parts of di(2-ethylhexyl) phthalate are mixed and used as in Example 1. This composition is more plastic than that of Example 1.

*Example 3.*—64 parts by weight of a conjointly polymerized vinyl resin having the approximate composition of 95% combined vinyl chloride and 5% combined vinyl acetate with a molecular weight as in Example 1, 2 parts of litharge, 1 part of lead stearate, 1 part of mineral oil, 2 parts of carbon black and 30 parts of di(2-ethylhexyl) phthalate are mixed and used as in Example 1. This composition is more plastic than that of Example 2.

*Example 4.*—55 parts by weight of a conjointly polymerized vinyl resin having the approximate composition of 95% combined vinyl chloride and 5% combined vinyl acetate and a molecular weight as in Example 1, 5 parts of litharge, 2 parts of carbon black, 1 part of mineral oil, 12 parts of tricresyl phosphate and 25 parts of di(2-ethylhexyl) phthalate are mixed and used as in Example 1. The composition is more plastic than that of Example 3 and the amount of plasticizer may be increased to a minimum of 40% which may be all di(2-ethylhexyl) phthalate. An advantage of di(2-ethylhexyl) phthalate is its compatibility with substantially all other modifiers.

The specific gravity of the compositions will vary between 1.28 and 1.33 but when up to 25 parts of filler are included may rise to approximately 1.54.

The compositions of the above examples are built for various purposes. The tougher material of Example 1 is especially recommended for industrial wiring where insulation must be tough and strong and must withstand bending and continual vibration, for instance house wiring, ship cables, etc. while the material of Example 4 is recommended where the insulation must withstand continual flexing, coiling, twisting, etc. yet yield readily for instance on the jack cords of telephone switchboards, the connections on telephone receiving sets or the wires on hearing aids for the deaf. The compositions of Examples 2 and 3 are built for insulation where a combination of toughness and flexibility is desired, for instance on overhead cables which are flexed by the wind but are not required to take the sharp bends of house wiring nor the violent and continuous bending of the wires of telephone sets. Insulation having the composition of Example 4 but using all di(2-ethylhexyl) phthalate is particularly useful for the wiring on hearing aids where there is no particular danger of fire but high insulating characteristics, long life, extreme flexibility, and resistance to deterioration due to the moisture and salts of perspiration are important.

In addition to plasticizing the conjoint polymers, which are the preferred materials of this invention, the di(2-ethylhexyl) phthalate may also alvantageously be used to plasticize other synthetic polymerized vinyl resins, for instance, a polymerized vinyl halide, such as polyvinyl chloride, and derivatives. Vinyl chloride and vinyl acetate have been used as examples because the chloride is the lowest cost and most frequently used of the halides which include the bromide, iodide and fluoride while the acetate exemplifies the esters of the lower aliphatic acids, for instance acetic, propionic, butyric, valeric and caproic acids.

All of the above compositions are resistant to aging and are flexible. The compositions containing chlorine either in the vinyl resin or in the plasticizer are quite resistant to fire. The compositions also seal against air, fumes, acids, alkalies, salts, moisture and oil and the di(2-ethylhexyl) phthalate minimizes any changes in characteristics due to changes in temperature, rendering their use important on ships, airplanes etc. particularly those used on salt water where, in the course of a season or a trip, the insulation is subjected to great temperature changes and is also subjected to acidic fumes and oil from the engines, moisture and salt from the water and alkalies from cleaning fluids. The insulation will withstand temperatures of 80° to 100° C. without substantial deterioration, thus giving an ample factor of safety where the insulation is subjected to tropical heat, for instance on cruise ships or navel vessels. Rubber, on the other hand, deteriorates quite rapidly under the influence of heat and oil.

A great advantage of the above compositions, however, is that due to their physical characteristics, so far as application to electrical conductors is concerned, they can be applied to conductors by means of the extrusion machines generally used to apply rubber insulation, or slight modifications of these machines, whereas insulating compositions based on oxycellulose, said phenol aldehyde and "Glyptal" resins do not have the physical characteristics which render them suitable for extrusion. The above compositions may also be applied to fabrics in substantially the same manner as rubber, for instance by calendering, and the treated fabrics used where a fabric including rubber cannot be used. The above compositions may also be formed into tapes either by extrusion into tape form or by sheeting and cutting into tapes which may then be used to wrap cables or other conductors. The overlapping edges of the tape may be sealed by solvents or by fusing with heat.

By means of appropriate solvents, such as mesityl oxide, isophorone, cyclohexanone, methyl isobutyl ketone, acetone or other ketone, solutions of the compositions may be made, the vinyl resins of lower molecular weight being more easily soluble than those of higher molecular weight. The solutions may be used for spray or dip treating materials, for instance electroplating racks may be sprayed or dipped, wire may be coated to form so-called "enameled" wire, textiles or fabrics or tapes may be coated or impregnated and used for wrapping or filling insulation or metal may be coated for protection against food acids, chemicals, etc. These compositions based on a vinyl resin with di(2-ethylhexyl) phthalate are useful wherever it is required to have a maximum plasticizing effect with a minimum amount of plasticizer so that while the composition is plasticized to the extent necessary, it otherwise has most fully the properties of the unadulterated vinyl resin or the properties of the compositions prepared by modifying the vinyl resin in the desired manner, for instance by including dyes, pigments, lubricants, etc. With the flexibility and stretching qualities imparted to the said vinyl resins by the plasticizer described herein, the coatings do not break away from the bases to which they are applied, for instance textile or metal, due to flexing or expansion or contraction.

From the above description, the subject matter of the invention can readily be followed by those familiar with the art to which it relates. It is to be understood, however, that the invention is not to be limited to the exact embodiments used for illustratiye purposes, but is to be construed as broadly as the following claims taken in conjunction with the prior art, may allow.

What is claimed is:

1. Electrical conductor carrying an insulating composition comprising a resinous monovinyl polymer derived predominantly from monomeric vinyl chloride and a plasticizer comprising di(2-ethylhexyl) phthalate.

2. Electrical conductor carrying an extruded insulating composition comprising a resinous vinyl polymer containing at least 90% by weight of vinyl chloride combined in the polymer and di(2-ethylhexyl) phthalate.

3. Electrical conductor carrying an insulating composition comprising a vinyl resin which is a conjoint polymer of a vinyl halide and a vinyl ester of a lower aliphatic acid and di(2-ethylhexyl) phthalate.

4. Electrical conductor carrying an insulating composition comprising a vinyl resin which is a conjoint polymer of vinyl chloride and vinyl acetate and di(2-ethylhexyl) phthalate.

5. Electrical conductor carrying an insulating composition comprising a vinyl resin which is a conjoint polymer of a vinyl halide and a vinyl ester of a lower aliphatic acid, a fire resistant plasticizer for the resin and di(2-ethylhexyl) phthalate.

6. Electrical conductor carrying an insulating composition comprising a vinyl resin which is a conjoint polymer of vinyl chloride and vinyl acetate, a lubricant for the resin and di(2-ethylhexyl) phthalate.

7. Electrical conductor carrying an insulating composition comprising a vinyl resin which is a conjoint polymer of a vinyl halide and a vinyl ester of a lower aliphatic acid, and aryl phosphate, coloring matter for the composition and di(2-ethylhexyl) phthalate.

8. Electrical conductor carrying an insulating composition comprising a vinyl resin which is a conjoint polymer of a vinyl halide and a vinyl ester of a lower aliphatic acid, tricresyl phosphate and di(2-ethylhexyl) phthalate.

9. Electrical conductor carrying an insulating composition comprising from approximately 58 to 76 parts of a vinyl resin which is a conjoint polymer of a vinyl halide and a vinyl ester of a lower aliphatic acid and from approximately 24 to 42 parts of a plasticizer for said resin, said plasticizer comprising di(2-ethylhexyl) phthalate.

10. Electrical conductor carrying an insulating composition comprising from approximately 58 to 76 parts of a vinyl resin which is a conjoint polymer of a vinyl halide and a vinyl ester of a lower aliphatic acid and from approximately 24 to 42 parts of a plasticizer for said resin, the major portion of said plasticizer being di(2-ethylhexyl) phthalate.

11. Electrical conductor carrying an insulating composition comprising a vinyl resin which is a conjoint polymer of a vinyl halide and a vinyl ester of a lower aliphatic acid and which has a molecular weight higher than about 15,000, a lubricant for said resin and a plasticizer for said resin, said plasticizer including di(2-ethylhexyl) phthalate.

12. Electrical conductor having an insulation including a textile carrying a plastic composition comprising a vinyl resin which is a conjoint polymer of a vinyl halide and a vinyl ester of a lower aliphatic acid and di(2-ethylhexyl) phthalate.

13. Metallic conductor for electricity having applied directly thereto a coating composition comprising a vinyl resin which is a conjoint polymer of a vinyl halide and a vinyl ester of a lower aliphatic acid and di(2-ethylhexyl) phthalate.

14. Electrical conductor having an insulation including a tape comprising a vinyl resin which is a conjoint polymer of a vinyl halide and a vinyl ester of a lower aliphatic acid and di(2-ethylhexyl) phthalate.

WILLIAM F. HEMPERLY.